United States Patent [19]
Thomas, Jr.

[11] Patent Number: 5,084,936
[45] Date of Patent: Feb. 4, 1992

[54] APPARATUS FOR RAISING AND LOWERING A ROTATABLE PLATFORM

[75] Inventor: Joseph R. Thomas, Jr., Tampa, Fla.

[73] Assignee: Airline Industrial Machinery, Inc., Tampa, Fla.

[21] Appl. No.: 553,216

[22] Filed: Jul. 12, 1990

Related U.S. Application Data

[63] Continuation-in-part of Ser. No. 385,395, Jul. 27, 1989, abandoned.

[51] Int. Cl.$^5$ .............................................. E01D 1/00
[52] U.S. Cl. ........................................ 14/71.5; 92/53
[58] Field of Search ............... 14/71.5, 71.7, 71.1, 14/71.3, 1; 92/53, 62, 151; 91/169, 170 MP; 254/93 R; 187/9 E; 248/354.1, 157, 161, 188.5; 108/144; 182/141

[56] References Cited

U.S. PATENT DOCUMENTS

| | | | |
|---|---|---|---|
| 2,565,730 | 8/1951 | Johnston et al. | 92/53 |
| 2,581,293 | 1/1952 | Read et al. | 14/71.5 |
| 2,700,169 | 1/1955 | Henion | 14/71.5 |
| 2,826,280 | 3/1958 | Troche et al. | 92/53 X |
| 2,875,457 | 3/1959 | Read et al. | 14/71.5 |
| 3,110,048 | 11/1963 | Bolton | 14/71.5 |
| 3,404,417 | 10/1968 | Wollard et al. | 14/71.5 |
| 3,412,412 | 11/1968 | Kjerulf et al. | 14/71.5 |
| 4,567,811 | 2/1986 | Piegza et al. | 91/169 |
| 4,842,238 | 6/1989 | Toiyama | 248/161 X |

Primary Examiner—Ramon S. Britts
Assistant Examiner—Gay Ann Spahn
Attorney, Agent, or Firm—Joseph C. Mason, Jr.; Ronald E. Smith

[57] ABSTRACT

An apparatus that raises and lowers a rotatable vestibule of the type used in airports to transfer passengers from a terminal building to a passenger loading bridge. A first plurality of telescoping columns are interconnected to and passively follow a second plurality of telescoping columns disposed interiorly of and in concentric relation with said first plurality of columns when the second columns are activated. J-shaped bushings made of Nylitron facilitate the extension and retraction of the columns and flat sections of that material provide additional bearing surfaces at other locations of the apparatus. The J-shaped bushing also provides stops that limit the extension of the apparatus.

21 Claims, 7 Drawing Sheets

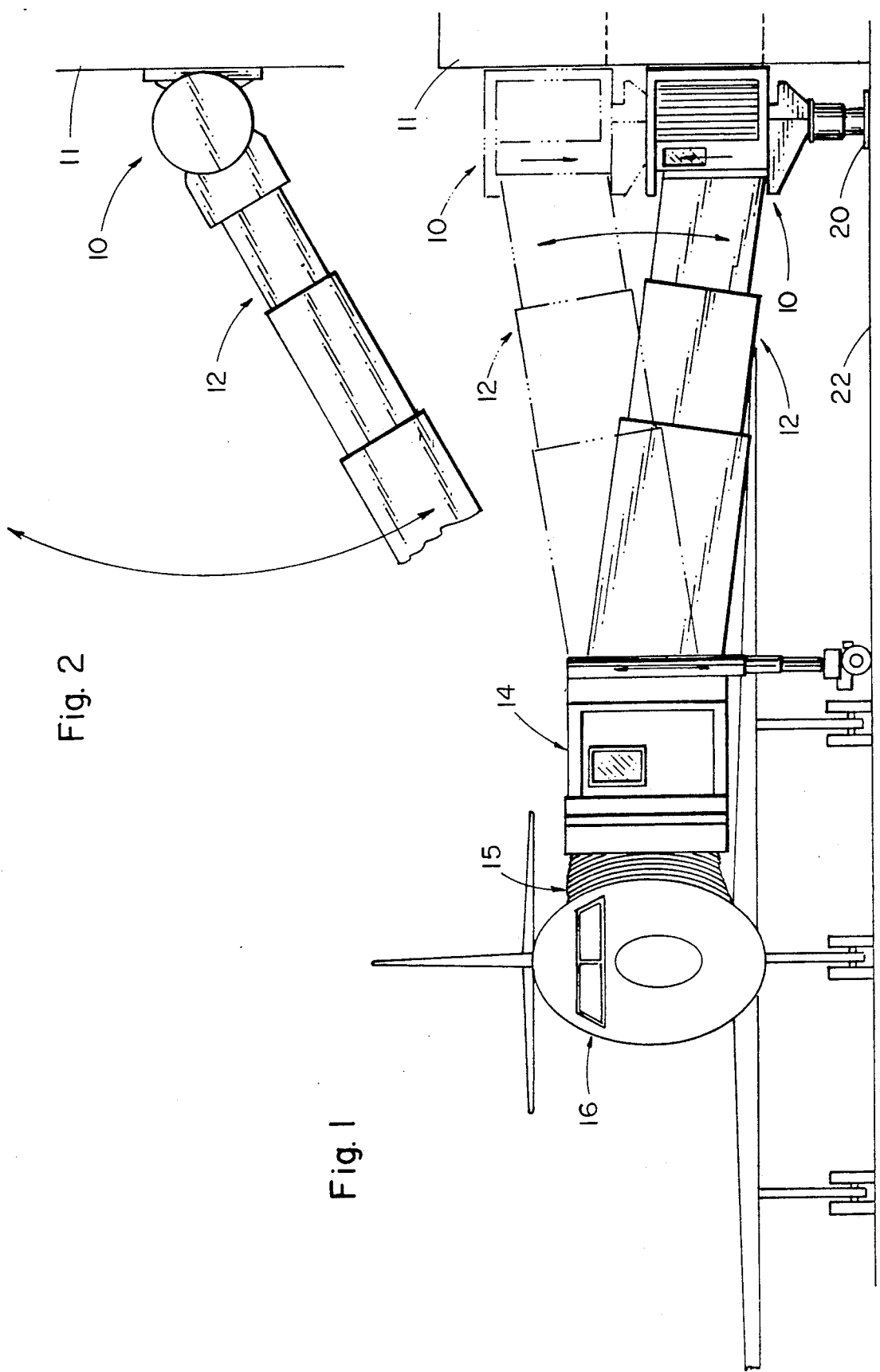

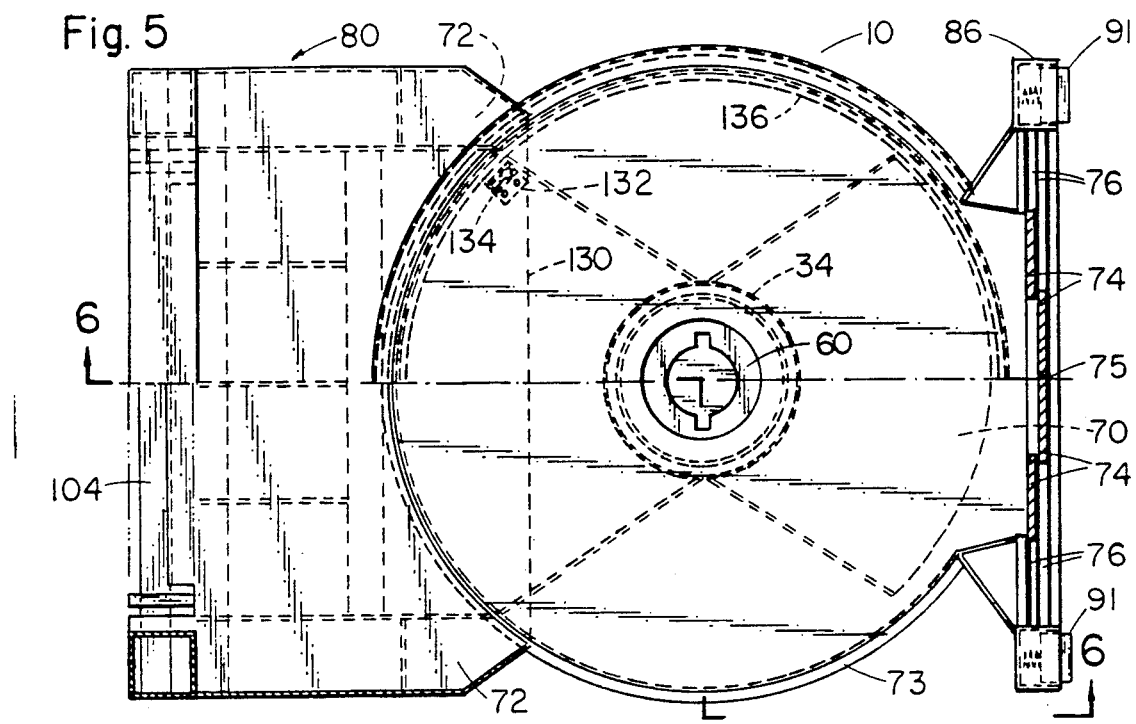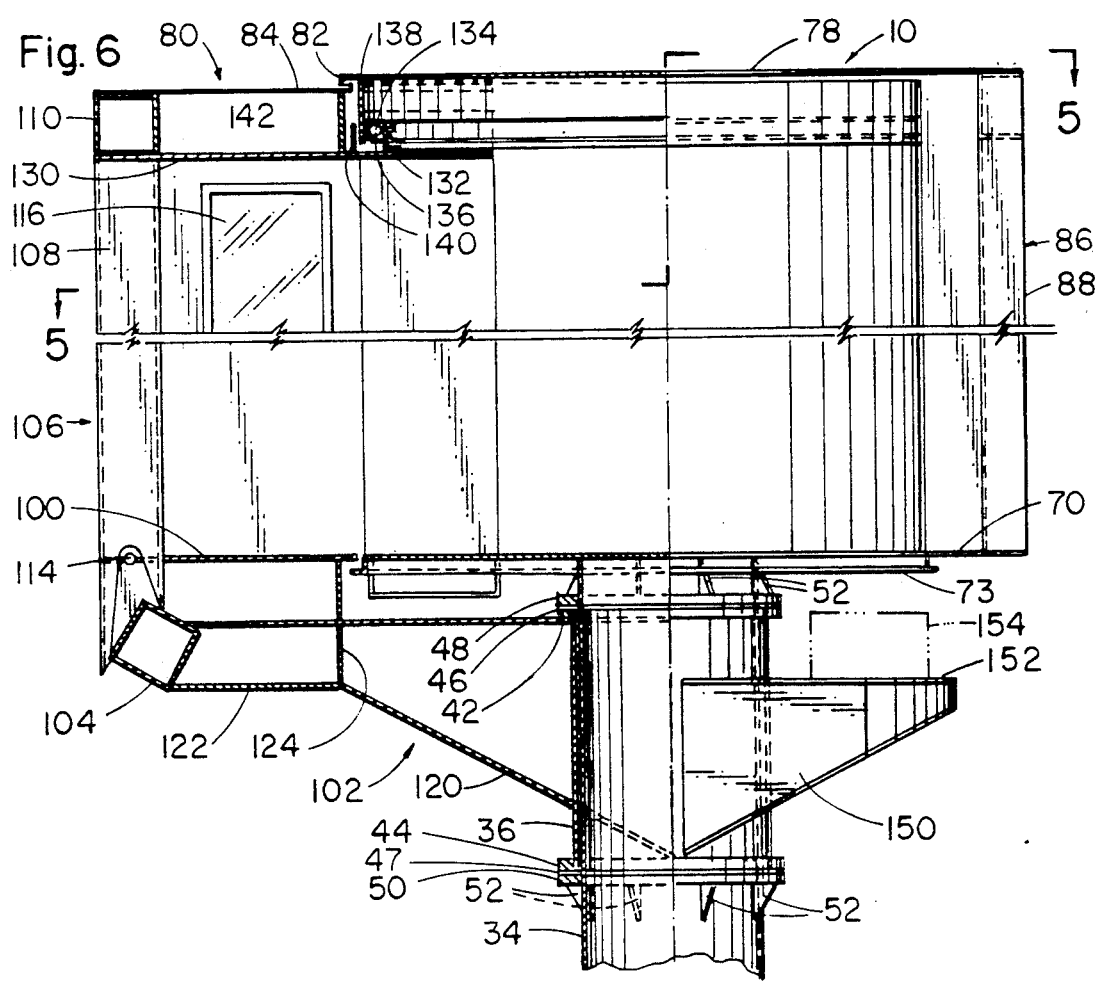

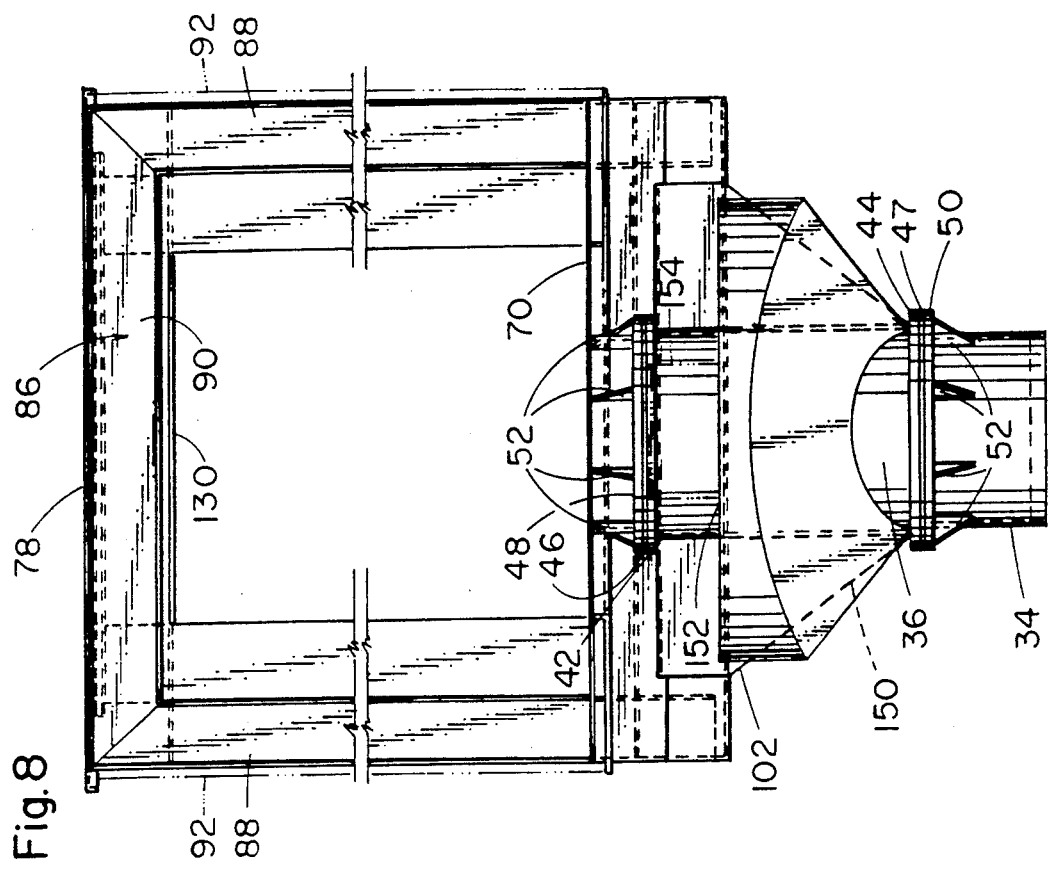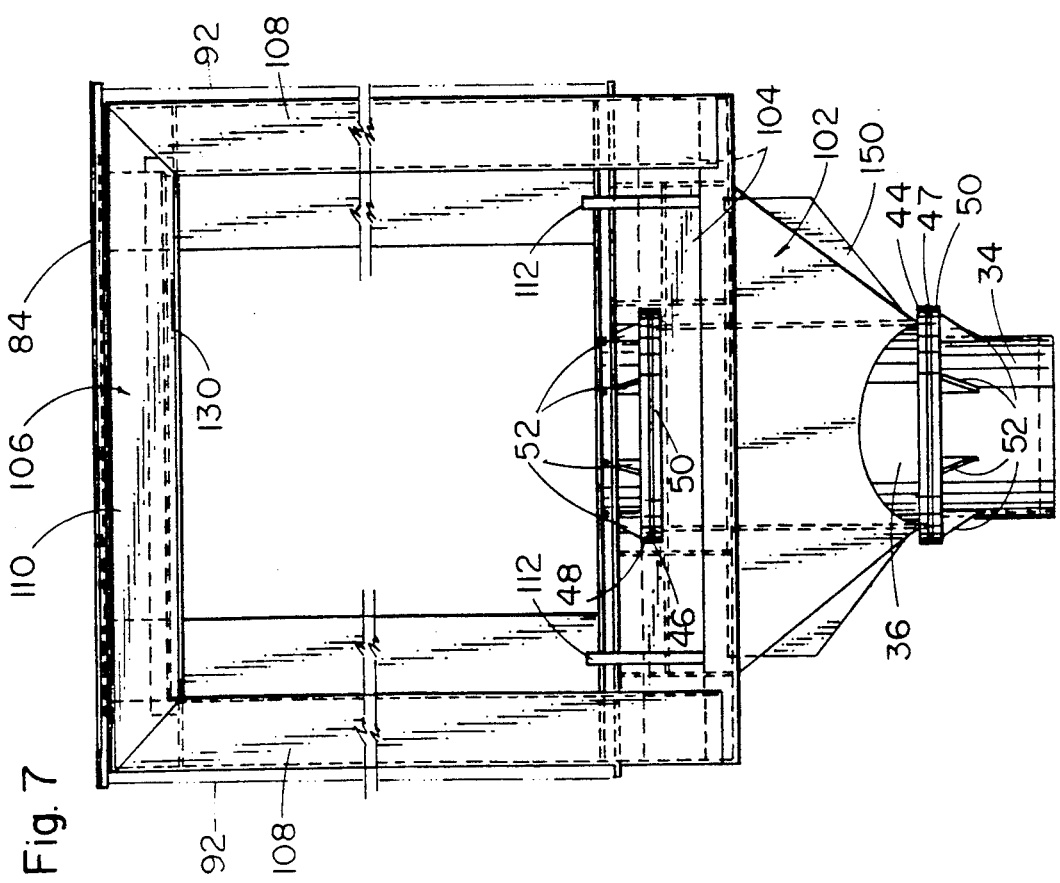

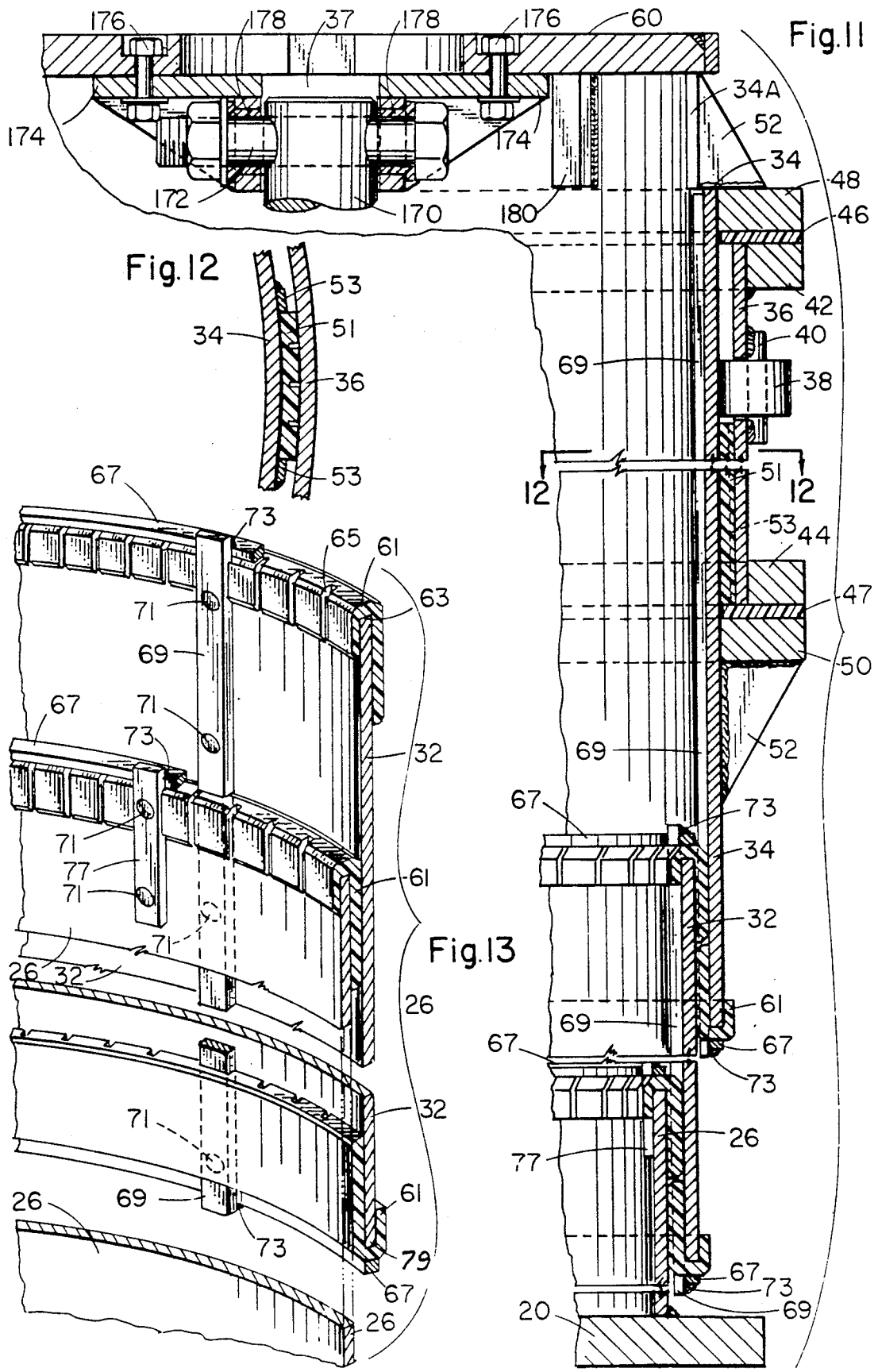

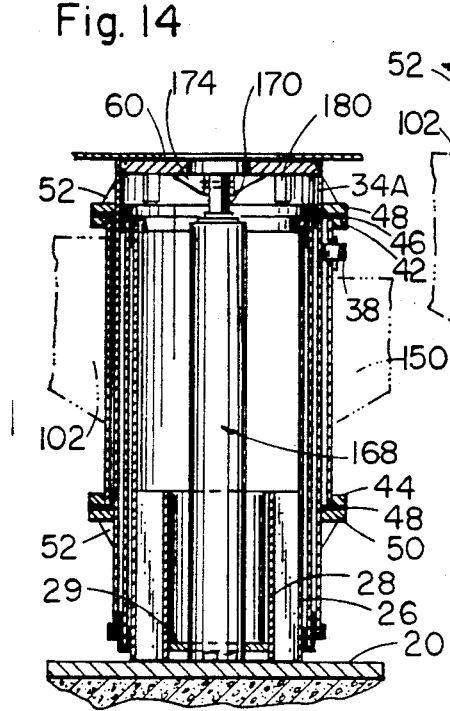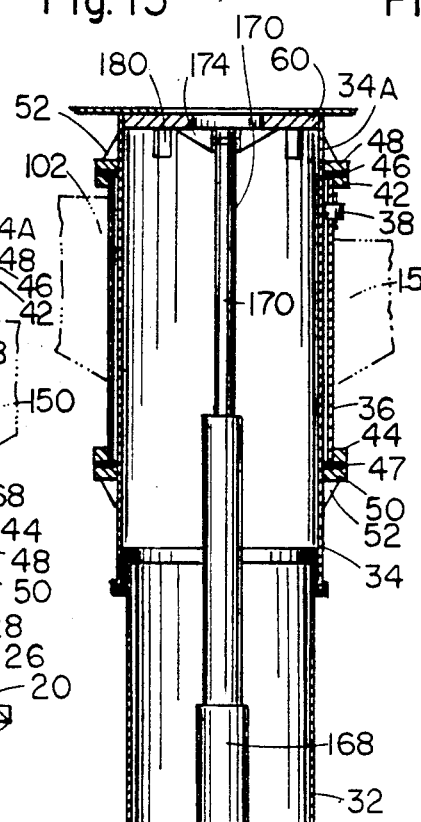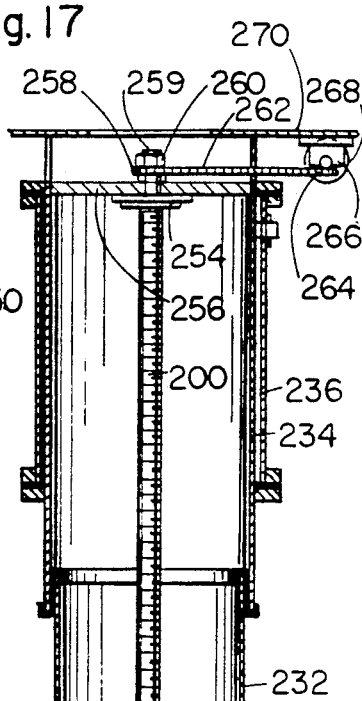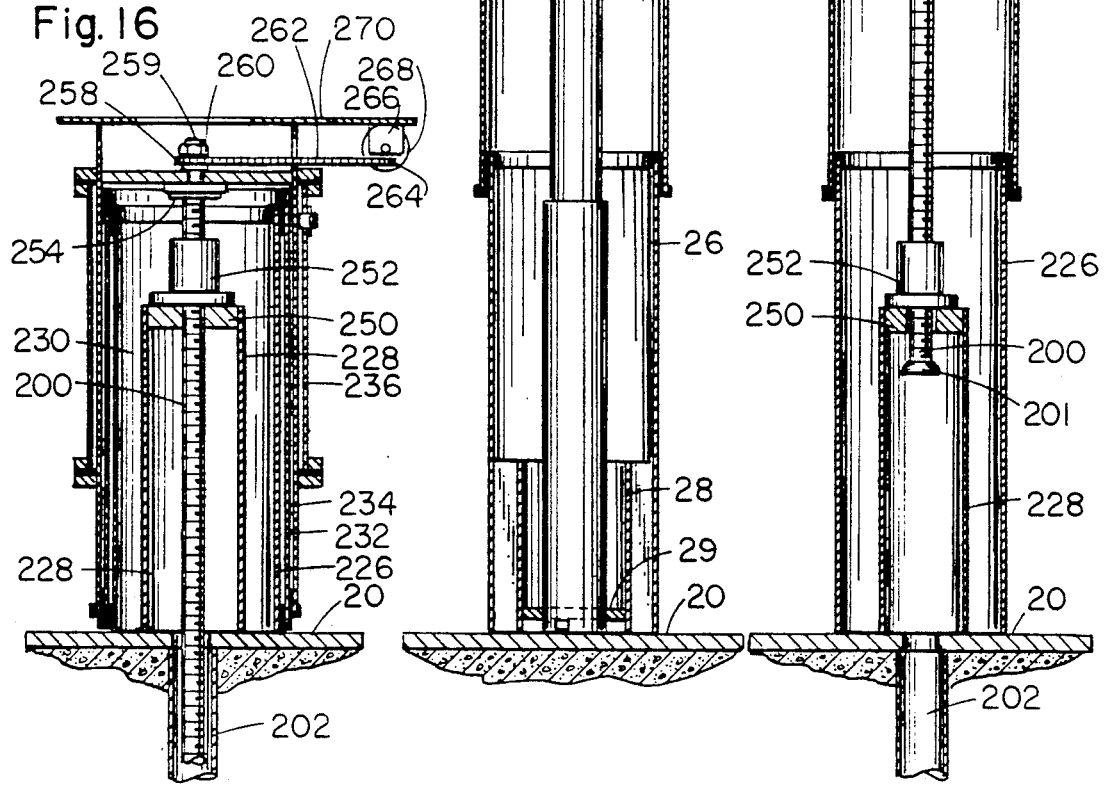

APPARATUS FOR RAISING AND LOWERING A ROTATABLE PLATFORM

This application is a continuation-in-part of application Ser. No. 07/385,395, filed July 27, 1989, now abandoned.

TECHNICAL FIELD

This invention relates, generally, to moving people at a transmit terminal and, more particularly, to an apparatus for trafficking people within and through an airport or like facility by a passenger loading bridge positioned between an aircraft and an airport terminal building with the end of the passenger loading bridge adjacent the terminal building being vertically adjustable.

BACKGROUND ART

In the early days of air travel, ladders were used to board and deplane aircraft. Passengers were therefore subjected to the elements and to aircraft noise both prior to boarding and after deplaning. Passengers were also injured, from time to time, in falls from the ladders.

Subsequently, passenger loading bridges were developed to provide a covered walkway between an elevated exit of the aircraft and an elevated location of a multi-story terminal building. The end of the passenger loading bridge adjacent to the aircraft was of a variable height to facilitate its use with different sizes of aircraft with different door heights. At the terminal end, however, the passenger loading bridge was of a fixed height. As such, passengers, whether entering or leaving the aircraft, would arrive and depart from the same elevational location of the terminal building.

Whether using ladders or conventional passenger loading bridges, inconvenience and confusion often occurs within the terminal building at the location where passengers arrive from or depart to, the aircraft. Such inconvenience and confusion is the result of an excessively large number of arriving and departing people moving in various directions. The intermixing of people at such location also amplifies security problems since previously screened and unscreened people are intermixed. Such intermixing further complicates the intended routing of preselected people to and from particular areas such as customs.

Various approaches have been attempted to improve passenger loading bridges in an effort to improve the trafficking of people in and through airport facilities. By way of example, note U.S. Pat. No. 2,581,293 to Read wherein side by side walkways are used on a common passenger loading bridge to allow for movement of people to and from different elevational locations at a terminal building.

U.S. Pat. Nos. 3,263,253, 3,341,875 and 3,404,417 to Wollard disclose mechanisms for adjusting the elevational location of one end of a passenger loading bridge while U.S. Pat. Nos. 3,184,772 to Moore and 3,412,412 to Kjerulf disclose mechanisms for adjusting the rotational orientation of a passenger loading bridge at the aircraft end.

The vertical movement of the terminal building end of a passenger loading bridge is disclosed in U.S. Pat. No. Re 26,859 to Riggles. U.S. Pat. Nos. 3,561,030 to Seipos and 4,110,859 to Lichti disclose passenger loading bridges of variable lengths, variable angular orientations and variable heights at their aircraft ends. A passenger loading bridge having its terminal building end at ground level is disclosed in U.S. Pat. No. 4,161,049 to Saunders.

More modern passenger loading bridges are disclosed in more recent U.S. Pat. Nos. 4,318,197 and 4,333,194 to Drozd, 4,490,869 to Morin, and 4,559,660 to Lichti as well as French Patent 1,270,168 to Lichti. Additional patents of interest include U.S. Pat. No. 4,842,238 to Toiyama, 2,565,730 to Johnston et. al., and 2,826,280 to Troche et. al. These more recent patents disclose various mechanisms to improve the extensibility of passenger loading bridges as well as their positionability at their aircraft ends both horizontally and vertically.

A vertically adjustable bridge is also in use at J. F. Kennedy International Airport; the terminal building itself is modified to accept the bridge, however, Thus, that structure cannot be retrofit into existing terminal buildings. Although many such advances are noteworthy to one extent or another, none achieves the objectives of an optimum passenger loading bridge which combines the benefit of the prior art practices without their shortcomings, i.e., a passenger loading bridge which provides for the efficient trafficking of people in and through an airport or like facility by being of a variable height at both ends, convenient and simple to operate and repair, reliable in operation over an extended life, and economical to both manufacture and maintain, and usable in relation to any unmodified terminal building.

As illustrated by the great number of prior patents and commercial devices, efforts are continuously being made in an attempt to improve passenger loading bridges and facilitate the trafficking of people through airports or like transit terminals. None of these previous efforts, however, provides the benefits of the present invention. Additionally, prior passenger loading bridges do not suggest the present inventive combination of component elements arranged and configured as disclosed and claimed herein. The present invention achieves its intended purposes, objects and advantages over the prior art devices through a new, useful and unbeliefs combination of component elements, with the use of a minimum number of functioning parts, at a reasonable cost to manufacture, and by employing only readily available materials.

Therefore, it is an object of this invention to provide an improved system for facilitating the movement of passengers at an airport facility comprising a terminal building having a plurality of passenger transfer zones disposed one above the other at the edge of the building.

It is another object of the invention to move people more efficiently within and through a transit terminal such as an airport.

It is a further object of this invention to traffic people through an airport facility via a passenger loading bridge which allows passengers to enter and leave the passenger loading bridge at different elevational locations at the terminal building as well as at the aircraft.

Another object of the present invention is to improve supporting structures for the terminal end of a passenger loading bridge to facilitate its raising and lowering to different elevational locations.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims in conjunction with the accompanying drawings.

DISCLOSURE OF THE INVENTION

The invention is defined by the appended claims with the specific embodiment shown in the attached drawings. For the purpose of summarizing the invention, the invention may be incorporated into an improved system for facilitating the movement of passengers at an airport facility comprising (1) a terminal building having a plurality of passenger transfer zones disposed one above the other, each transfer zone located at the edge of the building (2) an aircraft positionable at a distance from the building and having a door with a threshold across which passengers may move and (3) an elongated walkway having a first end and a second end positionable with its first end adjacent to the aircraft and its second end positionable adjacent to a preselected zone of said plurality of transfer zones. Each end has a supporting structure therebeneath for retaining each supported end at one of the plurality of elevational positions. The first end may be placed, by conventional means that form no part of this invention, at a height corresponding to the threshold of the aircraft independent of the height of such threshold. The second end is placed, by the novel structure, at a height corresponding to one of the transfer zones to allow for the movement of passengers between the aircraft and the terminal building independent of the height of the threshold of the aircraft or the height of the preselected transfer zone.

The walkway is covered and at least one of the ends is a covered vestibule with controls for effecting movement of the walkway. Further, at least one end is a vestibule with a top and side walls in a circular configuration and arranged for blocking the movement of passengers between the walkway and transfer zone to other than a predetermined direction. The invention may also be incorporated into an improved apparatus to couple one of a plurality of vertically spaced transfer locations at a transit terminal with the door way of an aircraft located thereadjacent. The apparatus comprises a ramp with a first end positionable adjacent to the door of the aircraft and a second end positionable adjacent to a preselected one of the transfer locations of the transmit terminal. The apparatus also comprises a first supporting device at the first end of the ramp to vary the elevational position of the ramp to correspond with the height of the door way of the aircraft and a second supporting device at the second end of the ramp to vary the elevational position of the ramp to correspond with the height of a preselected one of the transfer locations.

Lastly, the invention may be incorporated into an improved motion imparting mechanism comprising a plurality of cylindrical column members in telescoping relationship with respect to each other, means to effect movement between the members and thereby effect the lengthening and shortening of the mechanism and "J"-shaped motion limiting devices secured to at least a plurality of the members to limit the movement of the members with respect to each other. The motion limiting devices also serve as bushings. They are formed of a material known as Nylitron (trademark) and are secured to the upper edge of a lower column member, to the lower and upper edges of an intermediate column member, and to the lower edge of an upper column member.

The drive means for raising the cylindrical members or columns is preferably hydraulic wherein fluid is retained within a plurality of telescoping tubes concentrically located within the cylindrical column members.

In the alternative, the drive means may be a jack screw system including a motor supported at the upper end of the cylindrical members, a threaded jack screw depending therefrom, a threaded plate secured to the lower member and receiving the jack screw and an aperture beneath the members for receiving the jack screw when the column members are in their retracted configuration.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

FIG. 1 is a side elevational view of an exemplary embodiment of the invention coupled to an enclosed telescoping passenger bridge which connects to an aircraft;

FIG. 2 is a plan view of said embodiment with a part of the enclosed passenger bridge denoting an arc which covers up to 180 degrees;

FIG. 5 is a partial plan, partial sectional view of this embodiment taken along line 5—5 in FIG. 6;

FIG. 6 is a side elevational view showing the upper part of the elevating mechanism and a partial section taken along line 6—6 in FIG. 5;

FIG. 7 is a front elevational view of the structure shown in FIG. 6;

FIG. 8 is a rear elevational view of the structure shown in FIG. 6;

FIG. 11 is an enlarged sectional view of the three concentric cylinders of the mechanism and the collar;

FIG. 12 is a partial section of the uppermost column and the rotating collar showing the bushing therebetween;

FIG. 13 is a perspective view depicting the middle cylinder and the bottom cylinder;

FIG. 14 is a section of the elevating mechanism in its retracted configuration;

FIG. 15 is a section of the preferred elevating mechanism in its fully extended configuration;

FIG. 16 is a second embodiment of the retracted elevating mechanism utilizing a screw jack; and FIG. 17 is a cross section of the mechanism of FIG. 16 in its fully extended position.

Similar reference numerals refer to similar parts throughout the several views of the drawings.

BEST MODES FOR CARRYING OUT THE INVENTION

Figure 3:
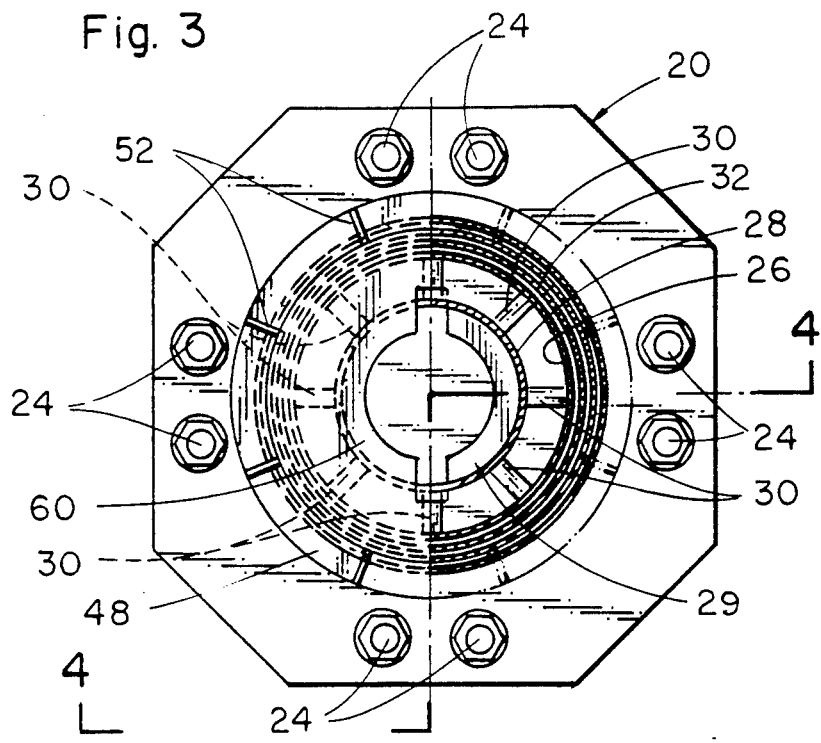
FIG. 3 is a partial plan view and partial sectional view taken along line 3—3 in FIG. 4.

Referring to FIG. 1, it will there be seen that an illustrative embodiment of the invention is denoted by the reference numeral 10 as a whole.

An enclosed telescoping passenger bridge is denoted 12, a control module of the passenger bridge is denoted 14 and an airliner is denoted 16.

FIG. 1, in solid shaded lines, depicts the novel structure 10 in its retracted configuration in registration with the lower floor of an airport airside building 11. The novel structure 10 is shown in phantom lines in its elevated or extended position to accommodate passengers at the second floor level. Control module 14 is movable in an arc (FIG. 2) as well as in and out from building 11 until it is positioned in registration with the passenger door of the aircraft with accordion-like coupling mechanism 15.

Referring now to FIG. 3, it will there be seen that a base plate 20 (see FIGS. 1 and 4) is affixed to a concrete base 22 by a series of anchor bolts 24. Innermost cylinder 26 is welded to base plate 20 and is supported by concentrically disposed support structure 28. A plurality of radially extending gussets 30 interconnect cylinder 26 and support structure 28 as perhaps best shown in FIG. 10.

The intermediate cylinder is denoted 32 and the uppermost cylinder is denoted 34.

Figure 4:
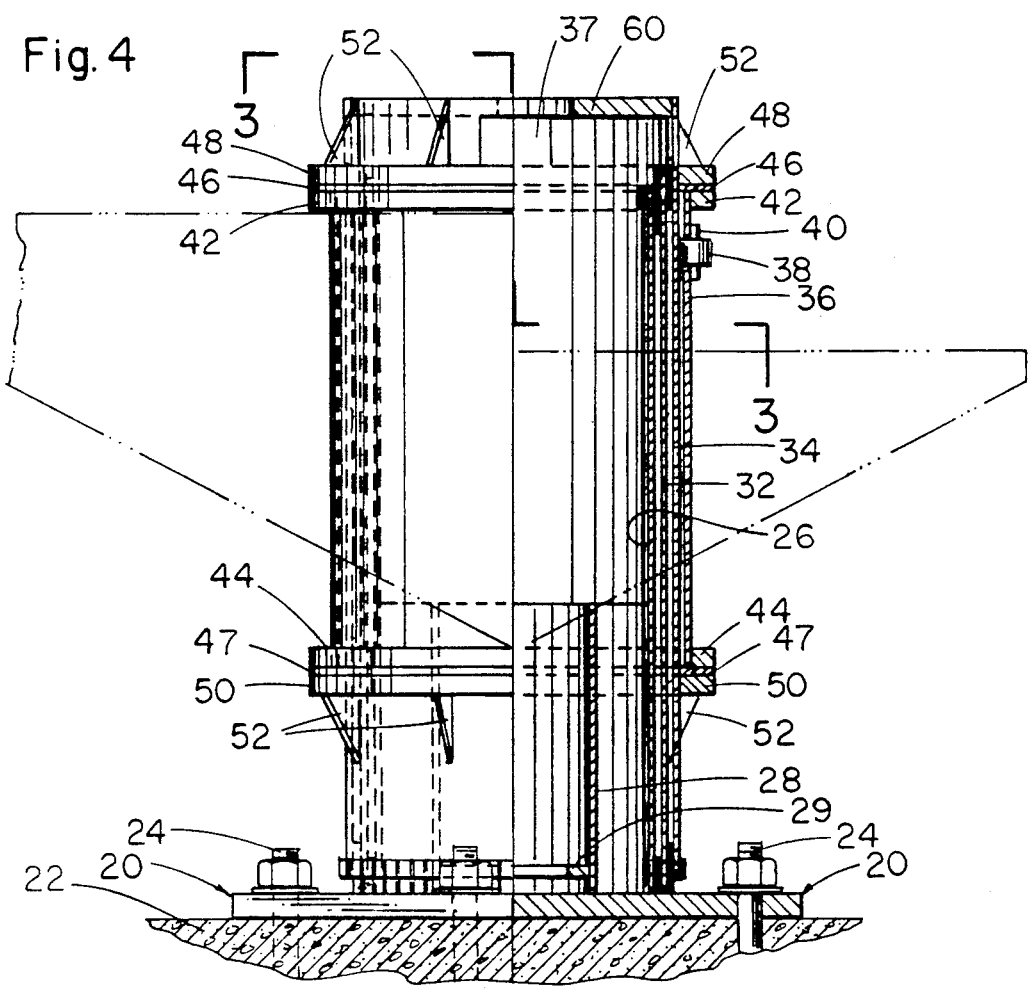
FIG. 4 is a partial side elevational view of the elevating mechanism taken along line 4—4 in FIG. 3.

As shown in FIG. 4, rotating collar 36 has three steel ball bearing rollers 38 which are rotatably mounted to the outside of said collar by an axle 40 and which rollingly engages the outer surface of the uppermost column 34 to take the stresses of the cantilever rotating part of the elevated rotunda vestibule (ERV).

Support rings or annular flanges 42 and 44 are welded to the outside of the collar 36 at opposite ends thereof. Said flanges come into contact with Nylitron (trademark) bearings 46 and 47 which separate the flanges 42 and 44 from the corresponding flanges 48 and 50 which are welded to the uppermost or third cylinder 34. Flanges 48 and 50 are gusseted by a plurality of circumferentially spaced triangular steel gussets 52.

Thrust plate 60 to which piston 170 (FIG. 15) is connected surmounts cylinder 34. The inner cylinders which raise these outer cylinders are omitted from FIGS. 3 and 4 for clarity. Circular opening 62 is formed in thrust plate 60 and includes notches 64 to accommodate radially projecting ears of the base of the cylinder which will be shown in other figures.

Four access holes 34A (FIGS. 11 and 14) are cut into the uppermost cylinder 34 to facilitate connection of the upper part of piston 170 to thrust plate 60.

Referring now to FIGS. 5-8, it will there be seen that rotunda floor plate 70 (FIG. 8) is mounted atop the outermost cylinder 34 just above thrust plate 60.

Extending outwardly from the floor is a circumferential angle which supports the roll away doors, not shown in this view, said doors being well known in this art. The roll away doors roll up into compartments on either side of the rotunda and provide an enclosure for the rotunda. The roll away doors are enclosed in compartments 72 (FIG. 5).

At the building side of the rotunda (i.e., on the right side of FIG. 5), are four sliding doors 74 that meet at a point 75. They retract into recesses 76 in much the same way as elevator doors in an elevator.

As best shown in FIG. 6, roof 78 is stationary in relation to rotation of the rotunda. The part of structure 10 that rotates is indicated by the numeral 13 with arrow. Lip 82 on roof 78 supports the upper part of the roll away doors and also forms a weather seal to the rotatable roof 84 of the rotunda.

Figure 9:
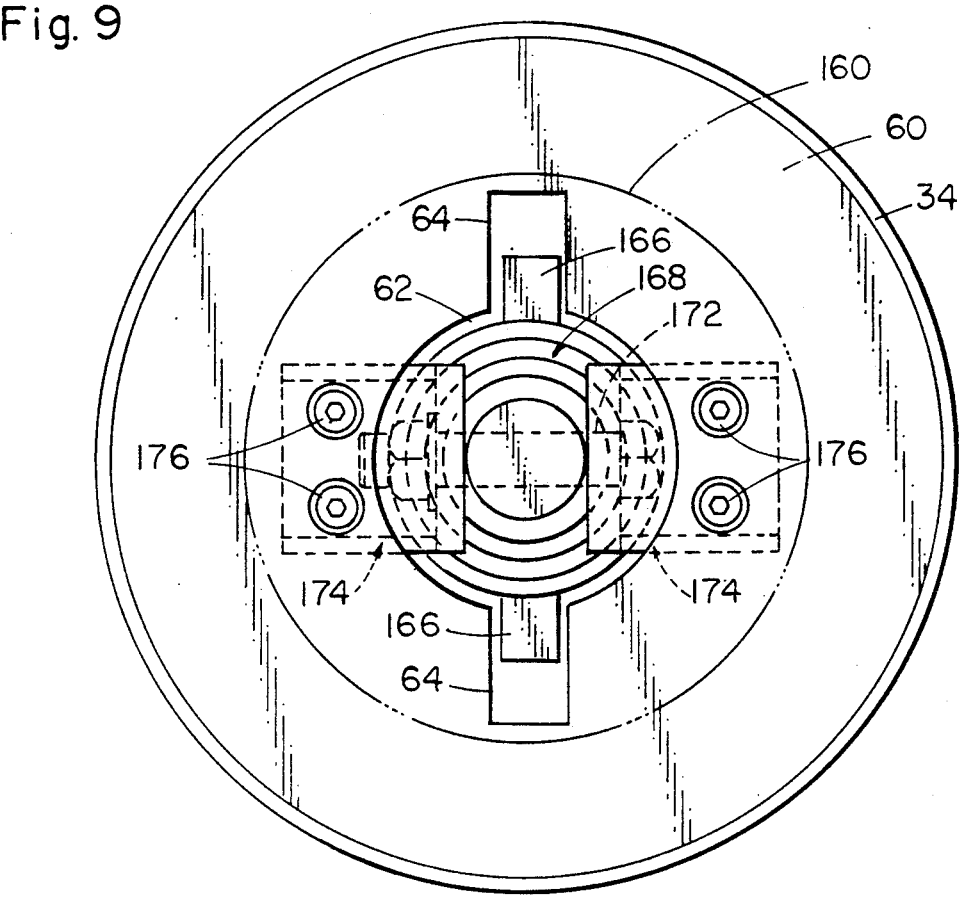
FIG. 9 is a plan view of the uppermost inner ring of the elevating mechanism.

As shown in FIGS. 8 and 9, non-rotatable roof 78 is supported on a rectangular frame 86 which has through upright parts 88 and a horizontal part 90. The frame is U-shaped in configuration and contains a resilient lining such as foam rubber 91 within the periphery of the frame 86. These foam rubber linings are retractable when the rotunda is elevated or lowered against the building. When the rotunda reaches a given floor, the resilient pads 91 are actuated against the building to form a weather seal. The actuating mechanism to retract and extend these pads need not be described.

The rollup doors previously mentioned are shown in phantom lines in FIG. 7 and FIG. 8 and are denoted 92.

It should be noted that the floor 70, like roof 78, is also non-rotatable. The floor 100 of the rotating part of the rotunda is supported by the cantilevered structure 102 which is welded to the collar 36. At the distal end of the cantilevered support 102 is a horizontal beam member 104, best shown in FIG. 6, that supports an inverted U-shaped frame 106 consisting of two upright legs 108 (FIG. 7) and a horizontal upper member 110. Horizontal beam member 104 supports a pair of clevises 112. Clevis brackets 112, through which extends a dowel pin 114 (FIG. 6) attach the bridge to the ERV. Pin 114 provides a pivoting point for the bridge mechanism.

Window 116 on either side of the rotatable part of the ERV enables the ERV operator to view the motion of the movable bridge at the airplane. The operator in the ERV merely raises and lowers the ERV at the appropriate times. The controls for this could be mounted on either side of the rotatable part of the ERV but are not shown.

The cantilevered structure 102 consists of an angularly disposed plate 120 attached to a horizontally disposed plate 122 to which the horizontal rectangular beam 104 is attached. Plate 124 supports the steel plate floor 100 of the rotatable part of the ERV.

Structural roof plate 130 (FIG. 7) extends inside the non-rotatable part of the rotunda. Supported on this structural roof plate are two or three clip angle devices 132 (FIG. 5) which enclose a plurality of spheres or ball-bearings 134 which ride in a channel 136 which circumscribes plate 138 which depends from the stationary roof 78 of the rotunda. It is through these ball bearing mounted brackets that the rotatable part of the rotunda is supported and guided in its motion about the non-rotatable part of the ERV.

Numeral 140 denotes an upright vertically mounted arched member. Mounted on the rotatable structural roof 130 of the rotatable part of the rotunda are a pair of upright members 142 which support the upper roof part of the rotatable part of the ERV and just inside that is another vertical arched member 140 which is also mounted to the structural roof 130. The purpose of the arched member 140 is to preclude any rain water which gets by the seal at 82 from entering into the non-rotatable part of the rotunda. This enables the water to run off either side of the rotatable part of the rotunda.

Compartment 150 is welded to the rearward side of collar 36 and contains the hydraulic fluid for the piston assembly that raises and lowers the rotunda. Tank 150 has a flat top 152 upon which is mounted the hydraulic pump, motors, and electrical gear which control the up and down motion of the piston, as indicated in phantom lines by the numeral 154. The appendage 150 which contains the hydraulic fluid may also support a lead weighted compartment to counter balance the rotatable part of the ERV.

Referring now to FIG. 9, opening 160, shown in phantom lines, is formed in floor 70 of the rotunda. Opening 160 is covered by a removable access plate, not shown. Thrust plate 60 has a central aperture 62 with radial keyways 64 to accommodate the protrusions or ears 166 of piston 168. The innermost ram 170 of the piston is pinned by a case hardened bolt 172 to a pair of brackets 174 mounted and welded to the underside of thrust plate 60. This is better seen in the cross section in FIG. 11 which will be hereinafter described. Brackets 174 are held in place by bolts 176.

Figure 10:
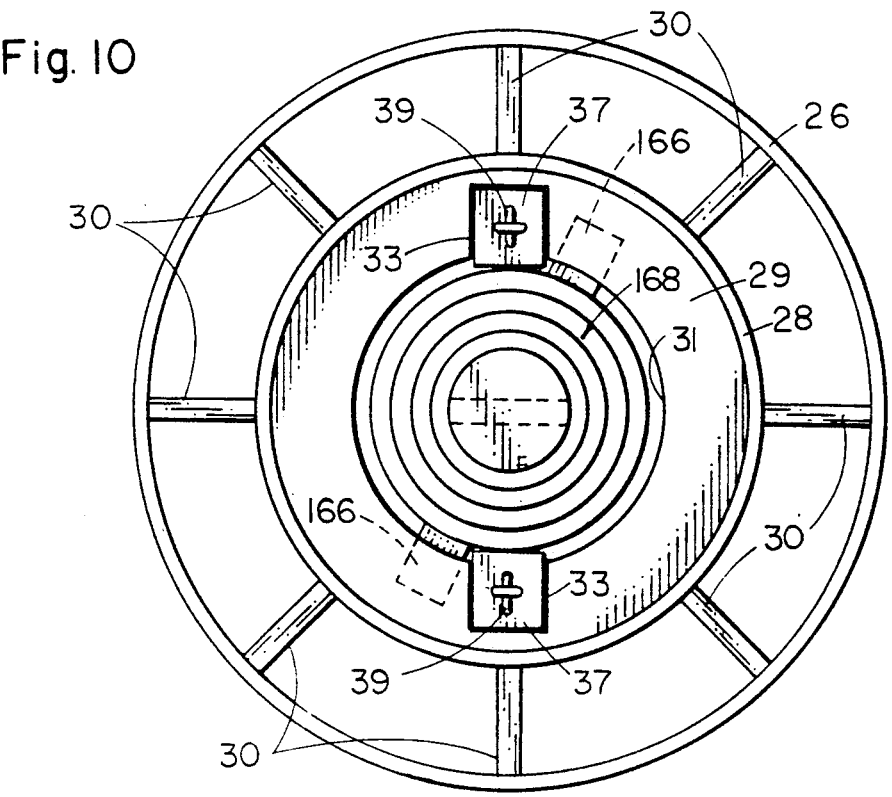
FIG. 10 is a plan view of the bottom ring of the locking mechanism for the base of the elevating piston.

Referring to FIG. 10, the initial stage of the ERV column arrangement includes column 26 and inner cylindrical enclosure 28 which is reinforced by a plurality of radially extending gussets as mentioned earlier. Near the bottom of the cylindrical enclosure 28 is a plate 29 having central opening 31 and notches 33 formed therein to receive ears 166 of the ram cylinder 167. Ears 166 of ram cylinder 167 are initially aligned with the keyhole openings 33, inserted therethrough, and then given a partial turn to lock the cylinder inside or within the space between plate 29 and base 20 of the ERV elevating mechanism. Subsequent to giving this ram piston or cylinder a clockwise turn as depicted, a pair of plugs 37 are inserted into the openings 33 to preclude the rotation of the jack into alignment with openings 33. This keeps the ram piston securely mounted or trapped within the base of the ERV mechanism.

Chain 39 is welded to the blocks or plugs 37 and said chain has a length sufficient to extend to the uppermost rim of the innermost cylinder 26. A mechanic can reach through access opening 64 and pull the plugs 37 out of the holes 33 by means of the chain when the ERV is retracted.

This construction in the base of the ERV prevents the bottom of ram piston 167 from being lifted out of its proper place and also serves to pull the ERV down to the retracted position without depending entirely on gravity. Gravity helps lower the rotunda, but this arrangement provides additional means of retracting the rotunda to the lowered position.

FIG. 11 shows thrust plate 60 attached to cylinder 34. A plurality of preferably four equidistantly and circumferentially spaced access openings 34A are provided at ninety degrees intervals about the upper periphery of cylinder 34. Angle brackets 174 are secured to the underside of thrust plate 60 by bolts 176. Case hardened pin 172 attaches the terminal piston end 170 to the brackets 174. Nylitron bushings 178 mounted in bracket 174 take the wear between the pin 172 and the brackets 174. Since hydraulic piston ram 170 is case hardened, there are no bearings where pin 172 goes through it.

Also at the underside of the thrust plate 60 are a plurality of safety stops 180, only one of which is shown here, to preclude the intermediate column 32 from extending into the access hole 34A when the rotunda is fully retracted.

A disk of Nylitron bearing 46 is sandwiched between upper flange 48 and flange 42 at the upper part of the collar. Similarly, Nylitron disk 47 is sandwiched between flange 44 and flange 50 which is attached to the third cylindrical column of the rotunda. A plurality of gussets 52 are arranged about the rings 48 and 50.

Located between upper column 34 and collar 36 are a plurality of vertically disposed Nylitron bearings 51. In this embodiment there are four of said bearings located at ninety degree intervals. Maintaining these Nylitron bushings in place are vertically disposed retainer flat bars 53 which are welded to the uppermost column 34. Also, this figure clearly depicts a steel cam follower in the form of roller 38 which is mounted on axle pin 40. A plurality of such rollers 38 are rotatably welded on the outer surface of collar 36. They make rolling contact with the outer wall of column 34 and take the maximum stress applied to the rear part of the column 34 when the rotatable part of the rotunda is being rotated. There are three such cam follower bearings mounted at approximately twenty two and one-half degrees in each direction from the center of the rear part of the rotunda collar 34 when it is disposed perpendicular to the building.

Collar 36 rotates about column 34 and is directly opposed to the rotatable part of the rotunda which is attached to the passenger bridge. The vertical Nylitron bearings 51 extend from the bottom of the collar or the top of the Nylitron disk 47 to the underside of the roller bearing 38.

The disposition of the Nylitron bearing 51 between collar 36 and the inner column 34 is perhaps best shown in FIG. 12.

FIG. 13 shows the intermediate cylindrical column 32 and the bottom innermost cylindrical column 26. At the upper edge of the cylinder 32 is a Nylitron shim bushing 61 which in this configuration has an inverted J-shape; it slips over the upper edge 63 of cylinder 32.

Cuts 65 extend approximately two-thirds to three quarters of the way through the Nylitron shim bushing. This enables the bushing to conform to the curvature of the cylinders.

After these J-shaped Nylitron bushings are pressed into place over the edges of the cylinder, a metallic retainer ring 67 is positioned into overlying relation thereto. Ring 67 is retained by a vertically disposed flat bar member 69 which is plug welded as at 71 at a plurality of locations to the inner wall of cylinder 32. Each weld is ground flush with the inner surface of the flat bar 69. The flat bar retainer members 69 extend above the retainer ring 67 and are welded thereto as at 73. Each vertical flat bar 69 extends below the bottom edge 75 of cylinder 32 at which point another J-shaped Nylitron shim bushing is slipped over said bottom edge with the short leg of the J on the outside of the cylinder. Retainer ring 67 is applied to the bottom of said Nylitron shim bushing 61, and said ring is held in place by the vertical flat bar 69 welded thereto by weld 73.

A plurality of flat bars 77 are likewise plug welded to the inner surface of cylinder 26 as at 71 and these flat bars 71 are welded directly to a retainer ring 67 as at 73. It is not necessary for any of the flat bars 77 to extend the complete length of the inner surface of the cylinder 26 as it is with the cylinder 32.

As perhaps shown in FIG. 11, flat bar 69 extends vertically from the access hole 34A to beyond the bottom of the cylinder 34 for the purpose of retaining the Nylitron shim bushing 61 at the bottom of the cylinder 34 in the same manner as the flat bar retainer shown in FIG. 13 on cylinder 32.

The outer part of the Nylitron shim bushing 61 on cylinder 32 is notched for the flat bar 69 to slide therewithin thereby forming a guide and preventing the various cylinders from rotating. Accordingly, all three of the cylindrical columns remain oriented in one rotational position at all times and do not follow the rotational motion of the collar as the collar is rotated.

FIG. 14 shows the ERV in its retracted or down position. It should be noted that stops 180, as pointed out earlier, prevent the third cylinder from retracting all the way down and closing off the access holes 34A. The ram piston collectively including telescoping members 167, 168, 169, 170 is clearly depicted in FIG. 14, with its innermost ram stage 170 connected to brackets 174.

FIG. 15 is the same section as FIG. 14 but the three stages of the lifting mechanism are fully extended as is the four stage ram piston. Note that the J-shaped bushings abut one another at opposite ends of the middle cylinder, thereby also serving as motion limiting means, and note how the long and short parts of the J-shaped bushings overlie he respective interior and exterior parts of their associated cylindrical columns.

FIG. 16 and FIG. 17 show another embodiment of the same invention that employs a screw jack to raise and lower the ERV. As can be seen in FIG. 16, screw shaft 200 extends into a shaft well 202. Inner column 226, an intermediate column member 232, an outer column member 234, and a collar 236 correspond to the columns and collar of the first embodiment. Within the innermost column 226 is a cylindrical support structural enclosure 228 similar to the one described as 28 in the first embodiment, near the top of which is a stationary thrust plate 250, which is welded inside the cylinder 228. Mounted atop this stationary thrust plate 250 is a Saginaw ball screw device 252, well known to those practiced in this art, which utilizes recirculating balls around a screw jack 200.

A screw jack shaft 200 continues upward to a thrust bearing 254, which is also well known to those practiced in this art, and that thrust bearing 254 is attached to the underside of a permanently welded thrust plate 256 within the outermost column member 234. The jack extends through the thrust plate 256 and receives a sprocket 258 which is affixed to the shaft by a nut 260. Link belt chain 262 extends through an access hole to another sprocket 264, which is attached to a shaft in a gear box 266, which is connected in driven relation to motor 268, all of which is attached to the underside of a stationary floor plate 270. When the motor is activated, it transfers rotary motion through the gear box 266 to sprocket 264 and through chain 262 to sprocket 258, which is affixed to the shaft extension 259 of the screw jack shaft 200. Thus, when it is rotated in the proper direction, it will raise the floor 270 of the rotunda. When the motor is reversed, it will lower the floor down into a retracted position.

FIG. 17 shows the same mechanism depicted in FIG. 16, but in the fully extended position. The bottom of flared part 201 of jack shaft 200 has come out of the well 202 near the underside of the thrust plate 250.

This invention is clearly new and useful. Moreover, it was not obvious at the time it was made to those of ordinary skill in this art, in view of the prior art, considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described,

What is claimed is:

1. A device for raising and lowering a rotatable vestibule, comprising:
   a plurality of upstanding cylindrical column members disposed in telescoping relation to one another;
   said plurality of column members including an uppermost column, at least one intermediate column, and a lowermost column;
   a plurality of upstanding ram piston members disposed in telescoping relation to one another interiorly of said plurality of column members and in concentric relation to said plurality of column members;
   said plurality of piston members including an uppermost piston, at least one intermediate piston, and a lowermost piston;
   a thrust plate member disposed in surmounting relation to said uppermost column of said plurality of column members;
   said uppermost ram piston member being secured to said thrust plate member;
   means for extending and retracting said plurality of ram piston members;
   said plurality of column members passively extending and retracting in accordance with extension and retraction of said plurality of ram piston members;
   motion limiting means for limiting the extension of said plurality of column members;
   means for facilitating sliding extension and retraction of said plurality of column members;
   said motion limiting means and said bushing means comprising a J-shaped member of a preselected material.

2. The device of claim 1, wherein said J-shaped member is secured to a lower end of said uppermost column, to an uppermost end of said lowermost column, and to opposite ends of said at least one intermediate column.

3. The device of claim 2, wherein each of said J-shaped members has a long part and a short part, and wherein said J-shaped member positioned at the lowermost end of said uppermost column has its long part disposed interiorly of said uppermost column in overlying relation thereto and its short part disposed exteriorly of said uppermost column in overlying relation thereto.

4. The device of claim 3, wherein the J-shaped member positioned at the uppermost end of said lowermost column has its long part disposed external to said lowermost column in overlying relation thereto and its short part disposed interiorly thereof in overlying relation thereto.

5. The device of claim 4, wherein the J-shaped member positioned at an upper end of said at least one intermediate column has its long part disposed exteriorly of said at least one intermediate column in overlying relation thereto and its short part interiorly thereof in overlying relation thereto.

6. The device of claim 5, wherein the J-shaped member positioned at a lower end of said at least one intermediate column has its long part disposed interiorly of said intermediate column in overlying relation thereto and its short part disposed exteriorly thereof in overlying relation thereto.

7. The device of claim 6, wherein the long, interior part of said J-shaped member of said uppermost column is disposed in abutting relation to the long, exterior part of said J-shaped member of said at least one intermediate column when said plurality of column members are fully extended.

8. The device of claim 7, wherein the long, exterior part of said J-shaped member of said lowermost column is disposed in abutting relation to the long, interior part of said J-shaped member at the lower end of said at least one intermediate column when said plurality of column members are fully extended.

9. The device of claim 8, further comprising an annular retainer member for retaining each of said J-shaped members into their respective operative positions relative to their associated column members.

10. The device of claim 9, wherein said J-shaped members are formed of Nylitron and wherein said Nylitron is weakened about its circumferential extent so that it fits the contour of said column ends.

11. The device of claim 8, further comprising a rotatably mounted collar disposed in ensleeving relation to said uppermost column and a rotunda vestibule integral therewith so that said vestibule and collar are simultaneously rotatable about an axis of rotation of said collar.

12. The device of claim 11, further comprising means retaining said first plurality of column members against rotation when said collar member is rotated.

13. The device of claim 12, wherein the number of said ram piston members exceeds the number of column members.

14. The device of claim 11, further comprising means facilitating rotation of said collar relative to said uppermost column, said means for facilitating being at least one Nylitron bushing member disposed between an external surface of said uppermost column and an interior of said collar.

15. The device of claim 14, further comprising a pair of vertically spaced, radially outwardly extending flange members secured to said exterior surface of said uppermost column member, said collar member positioned between said flange members.

16. The device of claim 15, further comprising a pair of vertically spaced, radially outwardly extending flange members secured to an exterior surface of said collar, said collar flange members being disposed in registration with said column flange members.

17. The device of claim 16, further comprising means for facilitating relative movement between said column flanges and said collar flanges.

18. The device of claim 17, wherein said means facilitating relative movement includes a pair of annular in configuration Nylitron bushings, said bushings being disposed in sandwiched relation between said column flanges and said collar flanges.

19. The device of claim 1, further comprising means for holding down said lowermost ram piston, said means including at least one ear member secured to and extending radially from the lowermost end of said lowermost ram piston, and means for engaging said at least one ear member.

20. The device of claim 19, wherein said means for engaging said at least one ear member includes a plate having a central opening for receiving said lowermost ram piston member therethrough, and said central opening having at least one radially extending key way for receiving said at least one ear member;

whereby said at least one ear member is positioned downwardly of its associated at least one key way and said lowermost column is rotated to misalign said at least one ear member and said at least one key way.

21. The device of claim 20, further comprising a roller member rotatably mounted to said collar that rollingly engages the exterior surface of said uppermost column member, said roller member facilitating relative rotation between said collar member and said uppermost column member.

* * * * *